US012771728B2

(12) United States Patent
Mishra et al.

(10) Patent No.: US 12,771,728 B2
(45) Date of Patent: Oct. 20, 2026

(54) SYSTEMS AND METHODS FOR DETERMINING, MANAGING, AND SECURING DATA IN FEDERATED DATA CHANNELS

(71) Applicant: BANK OF AMERICA CORPORATION, Charlotte, NC (US)

(72) Inventors: Amit Mishra, Chennai (IN); Nipun Mahajan, Lawrenceville, NJ (US); Krithika Viswanathan, Chennai (IN); Sankari Bhagavathiappan Pravin Kumar, Nagercoil (IN); Suganthi V Shanmugavelayutham, Chennai (IN); Yogesh Raghuvanshi, Pennington, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 9 days.

(21) Appl. No.: 18/608,342

(22) Filed: Mar. 18, 2024

(65) Prior Publication Data

US 2025/0294058 A1 Sep. 18, 2025

(51) Int. Cl.
*H04L 9/40* (2022.01)

(52) U.S. Cl.
CPC ............ *H04L 63/20* (2013.01); *H04L 63/102* (2013.01)

(58) Field of Classification Search
CPC .............................. H04L 63/20; H04L 63/102
See application file for complete search history.

(56) References Cited

U.S. PATENT DOCUMENTS

| | | | |
|---|---|---|---|
| 7,698,269 | B2 | 4/2010 | Zhou |
| 8,209,615 | B2 | 6/2012 | Gupta |
| 8,510,764 | B1 | 8/2013 | Deselaers |
| 9,083,581 | B1 | 7/2015 | Addepalli |
| 9,594,477 | B1 | 3/2017 | Ardakani |
| 9,806,942 | B2 | 10/2017 | Saxena |
| 9,807,644 | B2 | 10/2017 | Ma |
| 10,031,969 | B2 | 7/2018 | Maharajh |
| 10,042,933 | B2 | 8/2018 | Johl |

(Continued)

FOREIGN PATENT DOCUMENTS

WO 2007096603 A2 8/2007

*Primary Examiner* — Noura Zoubair
(74) *Attorney, Agent, or Firm* — Moore & Van Allen PLLC; Lauren M. Stokes

(57) ABSTRACT

Systems, computer program products, and methods are described herein for determining, managing, and securing data in federated data channels. The present disclosure is configured to identify a first communication channel and associated first communication data; determine, based on the first communication data, at least one third party communication requirement; initiate, based on the at least one third party communication requirement, at least one third party communication channel; assemble the first communication channel and the at least one third party communication channel by a communication federation operation; and collect the first communication data and the at least one third party communication data based on the federation session orchestrator, wherein the federation session orchestrator controls a pattern for requesting and collecting the first communication data and the at least one third party communication data.

19 Claims, 11 Drawing Sheets

(56) References Cited

U.S. PATENT DOCUMENTS

| | | | | |
|---|---|---|---|---|
| 10,061,489 | B2 | 8/2018 | Stein | |
| 10,089,053 | B2 | 10/2018 | Gerlach | |
| 10,127,089 | B2 | 11/2018 | Powell | |
| 10,180,833 | B2 | 1/2019 | Sogani | |
| 10,462,423 | B1 | 10/2019 | Nguyen | |
| 10,630,840 | B1 * | 4/2020 | Karp | H04M 3/5235 |
| 10,659,400 | B2 | 5/2020 | Moon | |
| 10,667,101 | B2 | 5/2020 | Molinet | |
| 10,965,810 | B1 * | 3/2021 | Farnsworth | G06F 21/30 |
| 11,113,456 | B2 | 9/2021 | Abrahami | |
| 11,617,011 | B2 | 3/2023 | Loheide | |
| 11,641,685 | B2 | 5/2023 | Kim | |
| 11,741,945 | B1 | 8/2023 | Sullivan | |
| 11,757,764 | B2 | 9/2023 | Bataineh | |
| 11,963,051 | B2 | 4/2024 | Umapathy | |
| 11,979,350 | B1 | 5/2024 | Eyuboglu | |
| 2013/0110815 | A1 | 5/2013 | Tankovich | |
| 2016/0196579 | A1 | 7/2016 | Koura | |
| 2016/0210334 | A1 | 7/2016 | Prophete | |
| 2020/0014642 | A1 | 1/2020 | Sidi | |
| 2020/0106850 | A1 | 4/2020 | Popowitz | |
| 2022/0014963 | A1 | 1/2022 | Yeh | |
| 2023/0291785 | A1 * | 9/2023 | Seok | G06F 9/4482 |
| 2023/0419275 | A1 * | 12/2023 | Fakhraie | G06Q 20/0855 |

* cited by examiner

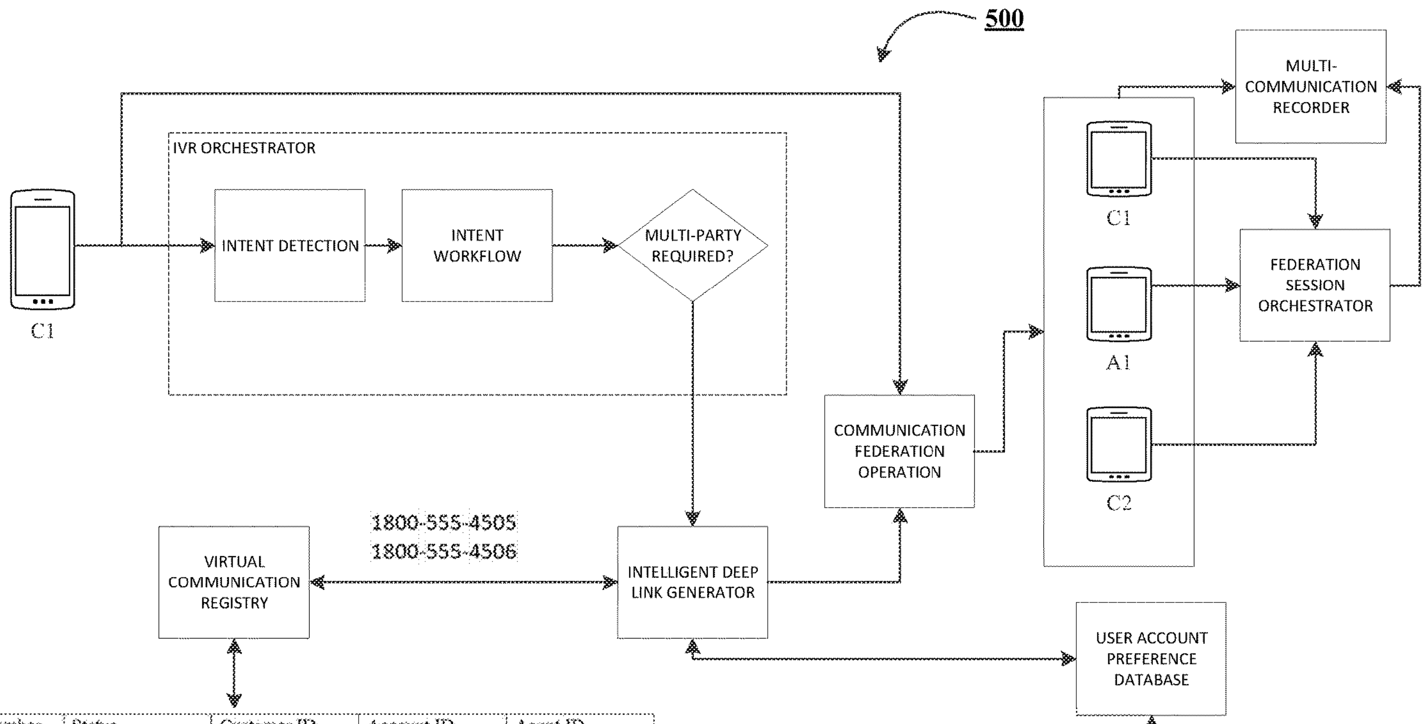

| Virtual Number | Status | Customer ID | Account ID | Agent ID |
|---|---|---|---|---|
| 1800-555-4504 | Available | NA | NA | NA |
| 1800-555-4505 | Occupied | 50002 | 356978 | |
| 1800-555-4506 | Occupied | 50003 | 356978 | |
| 1800-555-4507 | Occupied | 50004 | 746139 | |
| 1800-555-4508 | Available | NA | NA | NA |
| 1800-555-4509 | Available | NA | NA | NA |

| Customer Name | Account Ownership | Account ID | Channel Router |
|---|---|---|---|
| Client C | Joint Holder | 356978 | Application Insight |
| Client D | Joint Holder | 356978 | Online Banking Deeplink |

| Customer ID | Customer Name | Account Ownership | Account ID | Phone Number | Primary Channel Preference | Secondary Channel Preference | Channel Router |
|---|---|---|---|---|---|---|---|
| 50001 | Client A | Primary | 356978 | 715-555-4632 | IVR | Mobile App | IVR Deeplink |
| 50002 | Client C | Joint Holder | 356978 | 715-555-4784 | Erica Virtual Assistant | Online Banking | Application Insights |
| 50003 | Client D | Joint Holder | 356978 | 715-555-7496 | Online Banking | Financial Center | Online Banking Deeplink |
| 50004 | Client B | Primary | 746139 | 715-555-1258 | Mobile App | Application Virtual Assistant | Mobile App Deeplink |

FIGURE 5

700

Session ID Creation

| Customer Id | Cust Name | Address | Contact # | Email |
|---|---|---|---|---|
| 1001 | A | | | |
| 1002 | B | | | |
| 1003 | C | | | |

| Account Id | Account Type | Customer Id | Relationship Id |
|---|---|---|---|
| *****4001 | Joint Account | 1001 | xyz1 |
| *****4001 | Joint Account | 1002 | xyz1 |
| *****4001 | Joint Account | 1003 | xyz1 |

| Federation Id | Relationship Id | Federation Token | Expiry | Channel |
|---|---|---|---|---|
| Fed1 | xyz1 | Encrypt(AcctId+Relationship Id + all customer Ids+Time) | date | IVR |

FIGURE 7

SYSTEMS AND METHODS FOR DETERMINING, MANAGING, AND SECURING DATA IN FEDERATED DATA CHANNELS

TECHNOLOGICAL FIELD

Example embodiments of the present disclosure relate to determine, manage, and secure data in federated data channels.

BACKGROUND

Electronic communications, especially communication platforms such as interactive voice response (IVR) systems, cannot handle multi-party communications while also protecting privacy between each party's communication data. For example, and where an account requires multiple parties to contribute over remote and electronic communications, a need exists for a system to protect user data over remote communications, while also promoting automatic and dynamic federated data channels to promote efficiency, data security, and automatic collection of communication data.

Applicant has identified a number of deficiencies and problems associated with securing data in a federated data channel between multiple communications channels. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for determining, managing, and securing data in federated data channels.

In one aspect, a system for determining, managing, and securing data in federated data channels. In some embodiments, the system may comprise: a memory device with computer-readable program code stored thereon; at least one processing device operatively coupled to the at least one memory device and the at least one communication device, wherein executing the computer-readable code is configured to cause the at least one processing device to: identify a first communication channel and associated first communication data; determine, based on the first communication data, at least one third party communication requirement; initiate, based on the at least one third party communication requirement, at least one third party communication channel; assemble the first communication channel and the at least one third party communication channel by a communication federation operation, wherein the communication federation operation organizes the first communication channel and the first communication data with the at least one third party communication channel and at least one third party communication data based on a federation session orchestrator; and collect the first communication data and the at least one third party communication data based on the federation session orchestrator, wherein the federation session orchestrator controls a pattern for requesting and collecting the first communication data and the at least one third party communication data.

In some embodiments, the first communication data comprises an identification of an account identifier for the first communication channel, and wherein the at least one third party communication requirement is based on the account identifier.

In some embodiments, the first communication channel and the at least one third party communication comprise one communication channel type.

In some embodiments, the first communication channel and the at least one third party communication comprise different communication channel types.

In some embodiments, the first communication channel occurs within an interactive voice response (IVR) channel type.

In some embodiments, the communication federation operation comprises a process for organizing the identified at least one third party communication channel and the first communication channel based on identifying a primary user account associated with the first communication data or the at least one third party communication data.

In some embodiments, executing the computer-readable code is configured to cause the at least one processing device to: access a virtual communication registry based on the first communication data; identify, within the virtual communication registry, at least one available communication channel; select the at least one available communication channel for the at least one third party communication channel; and update, based on the selected at least one available communication channel, the virtual communication registry with an account identifier or a user identifier for the selected at least one available communication channel. In some embodiments, the selected at least one available communication channel is based on a user account preferred communication channel type associated with the user identifier. In some embodiments, the user account preferred communication channel type comprises a primary channel preference, a secondary channel preference, and a channel router preference.

In some embodiments, executing the computer-readable code is configured to cause the at least one processing device to: identify an available agent communication channel; and apply the available agent communication channel to the first communication channel and the at least one third party communication channel based on the communication federation operation. In some embodiments, the available agent communication channel communicates with the first communication channel and the at least one third party communication channel. In some embodiments, the available agent communication channel communicates with the first communication channel and the at least one third party communication channel at a same time or near same time. In some embodiments, the first communication data is protected from the at least one third party communication channel, and wherein the at least one third party communication data is protected from the first communication channel.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
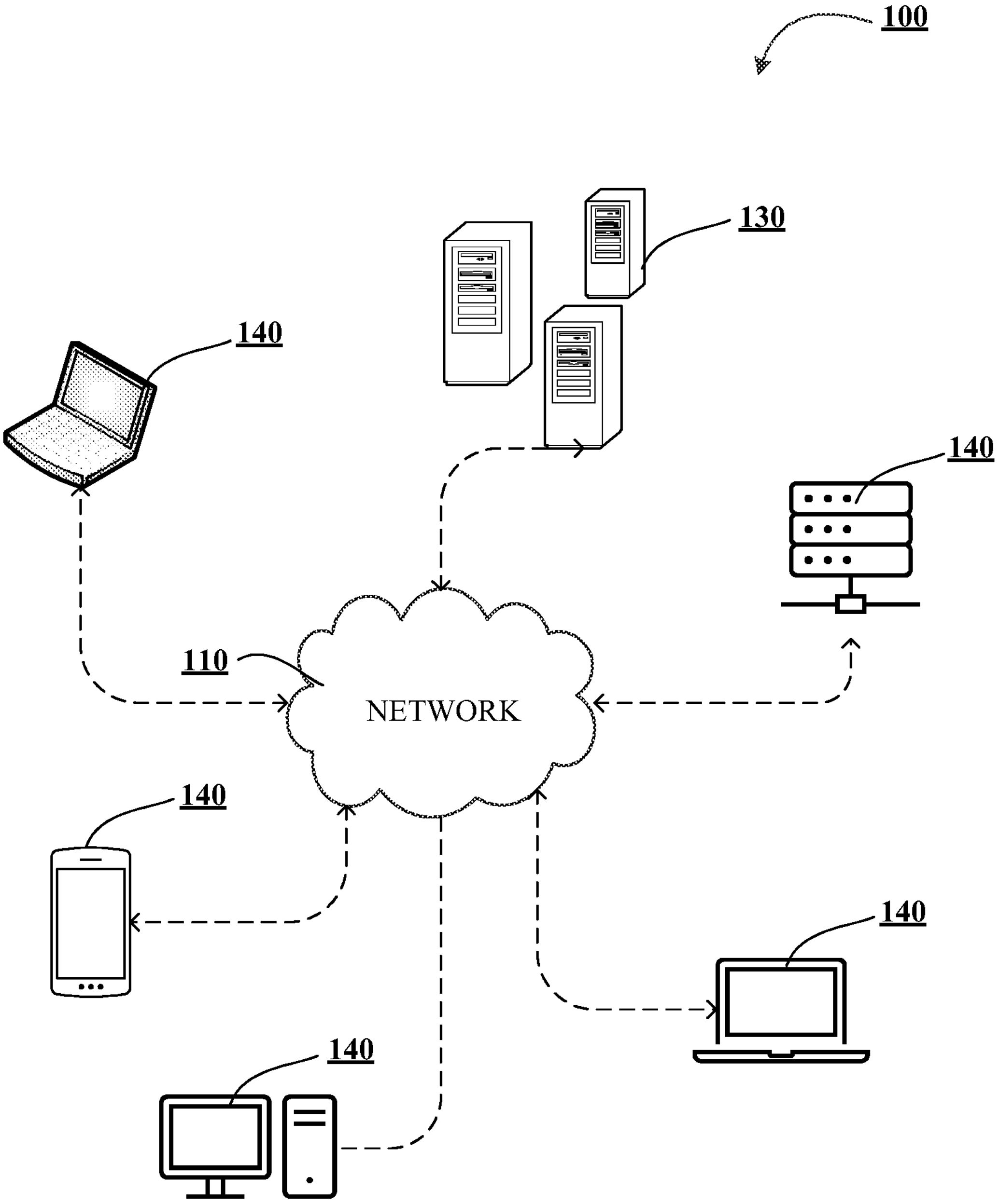
Figure 1B:
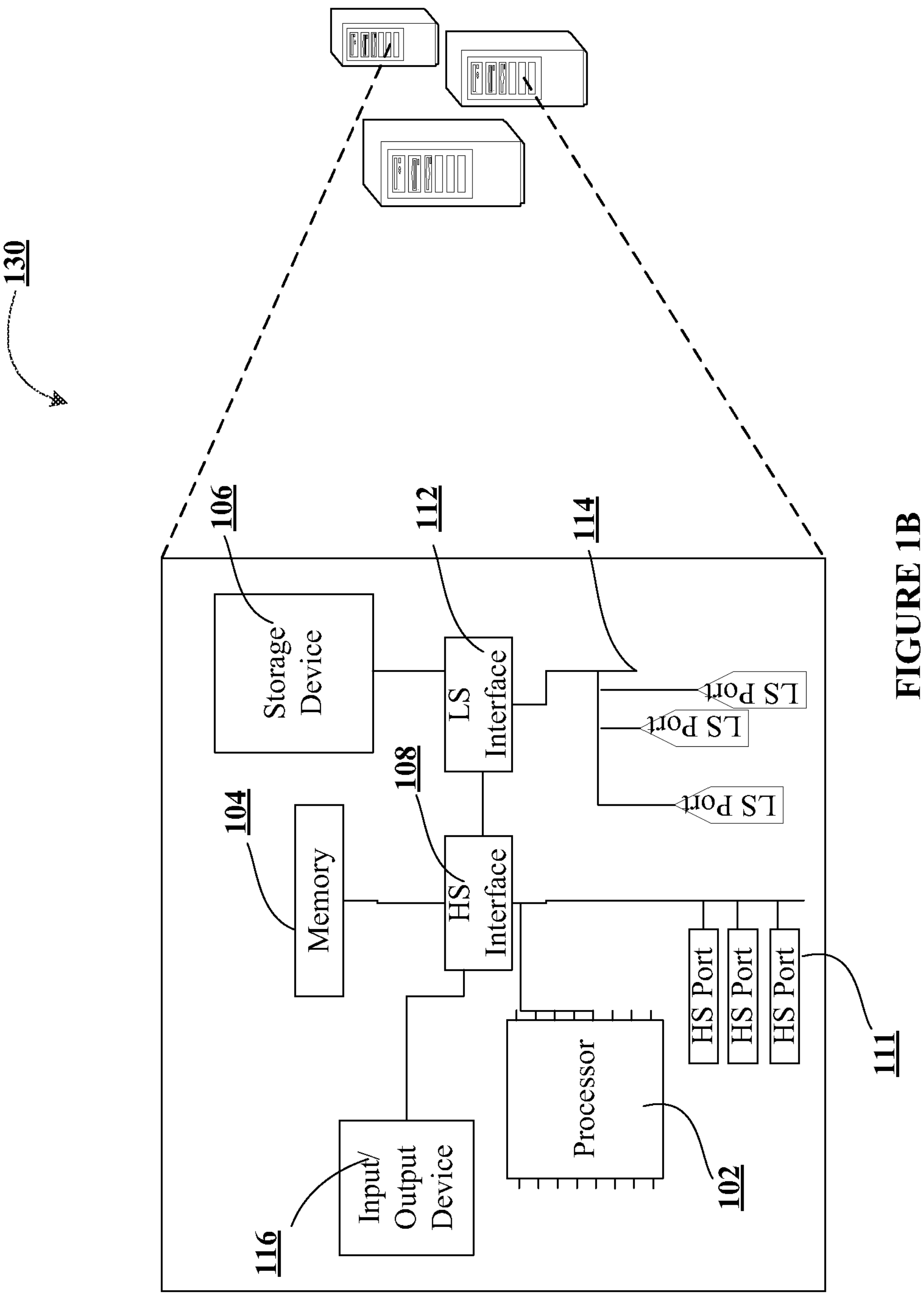
Figure 1C:
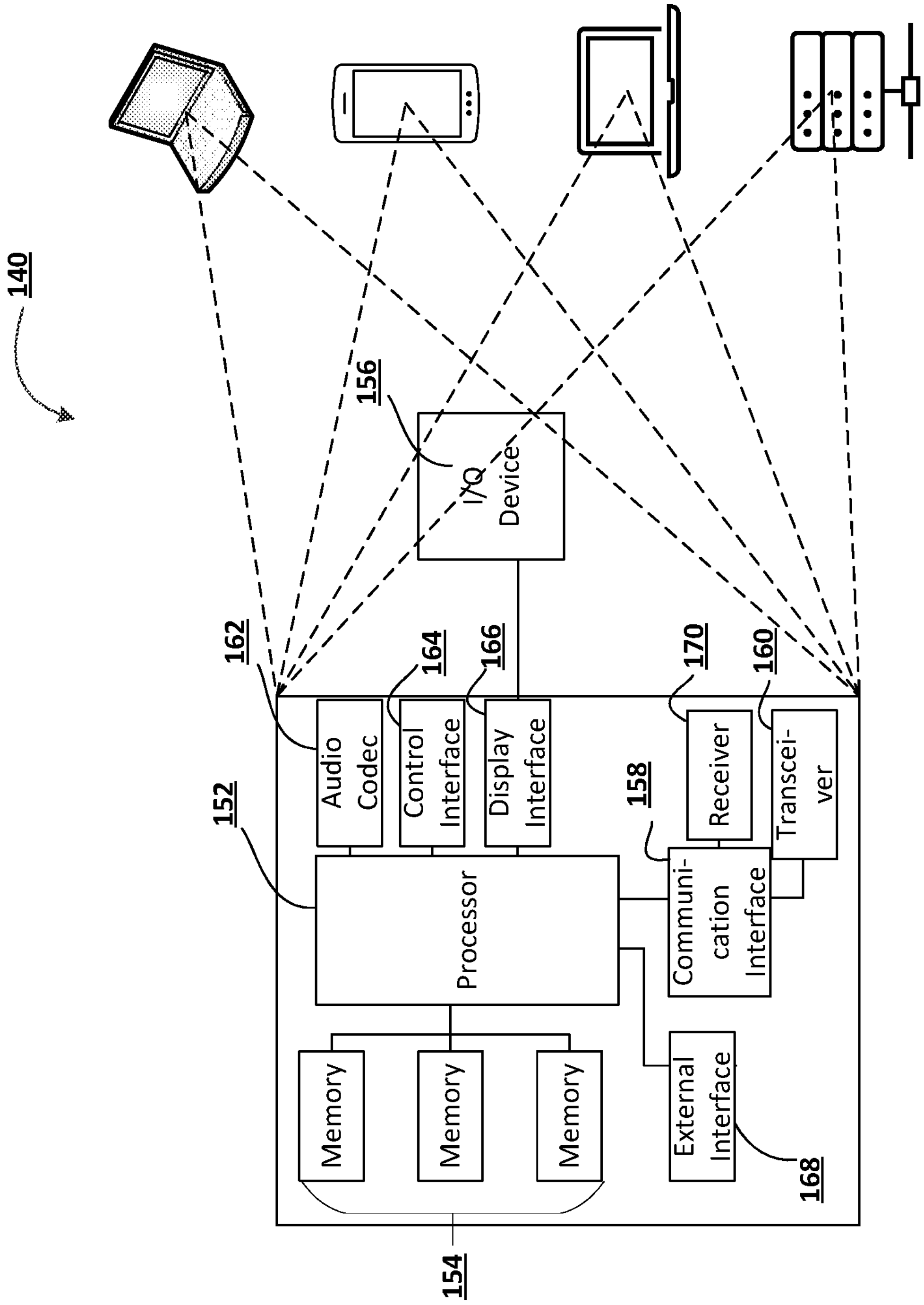
Figure 2:
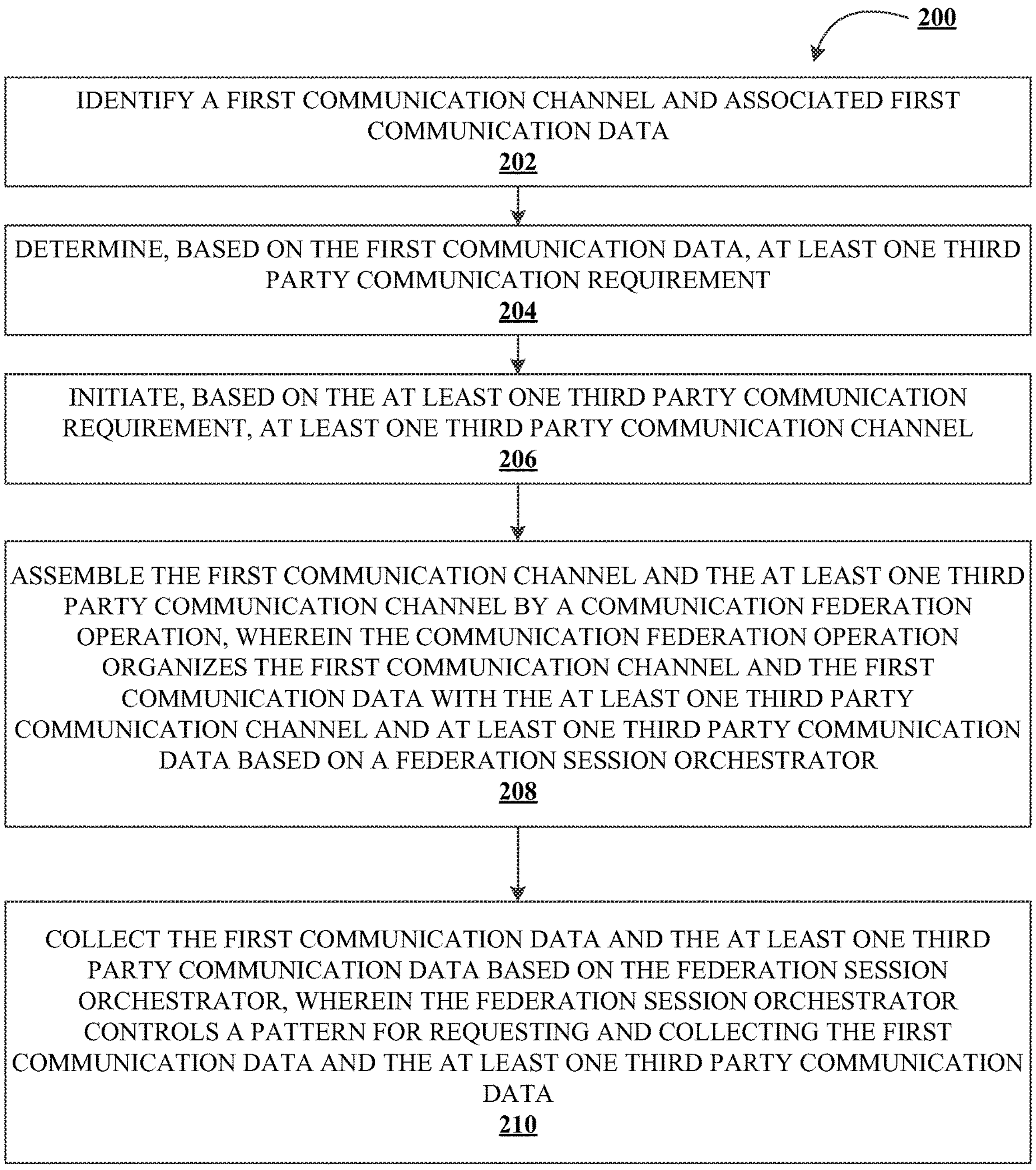
Figure 3:
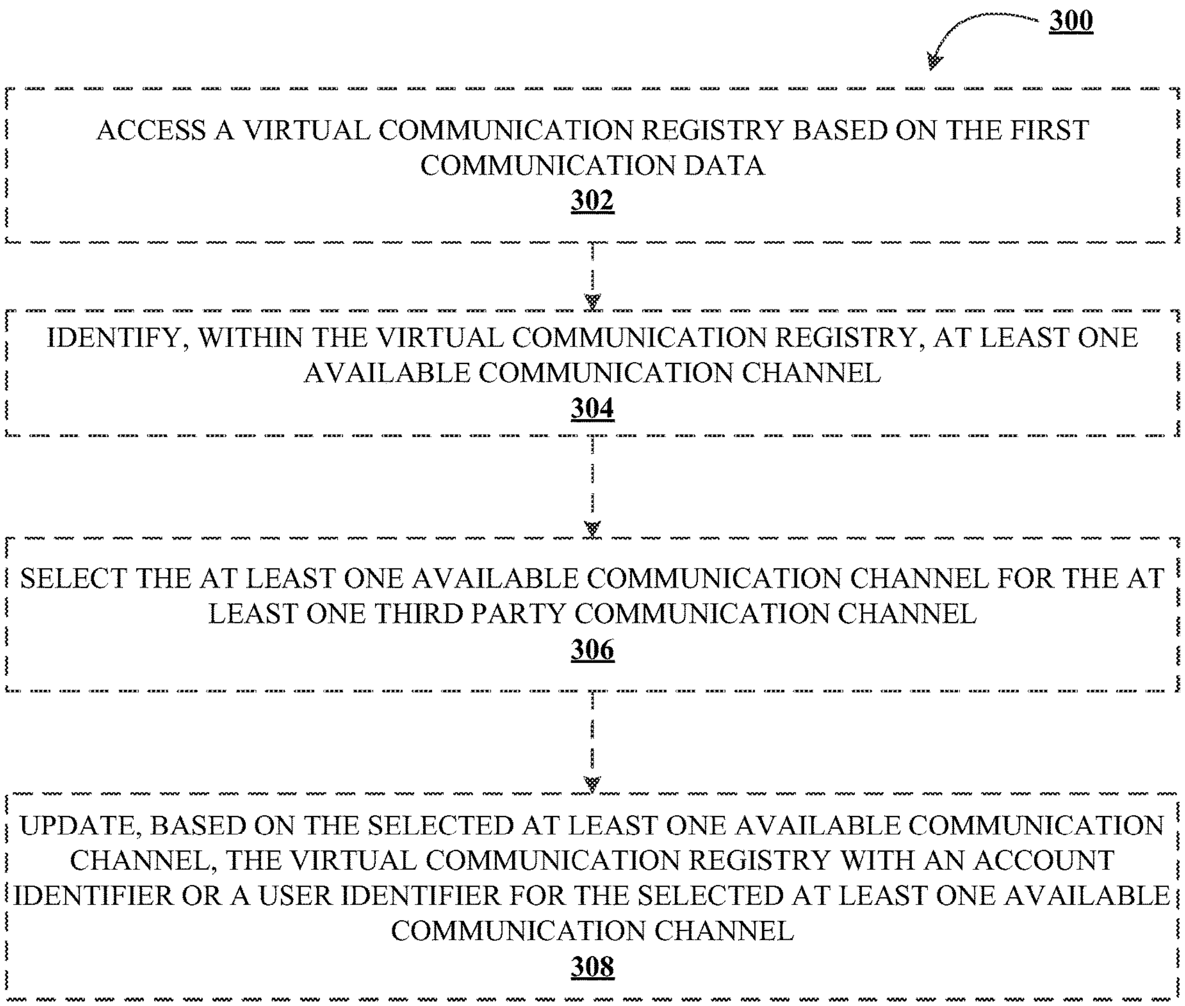
Figure 4:
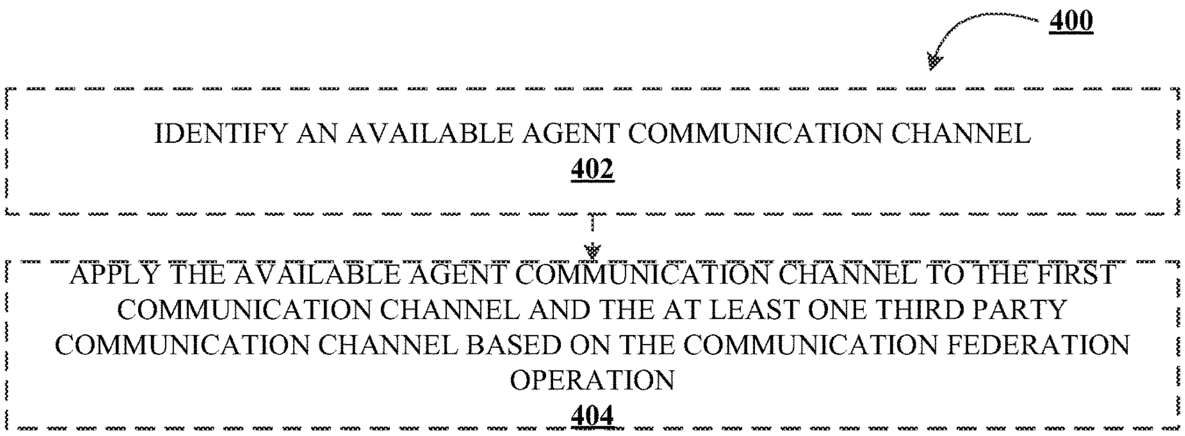
Figure 6:
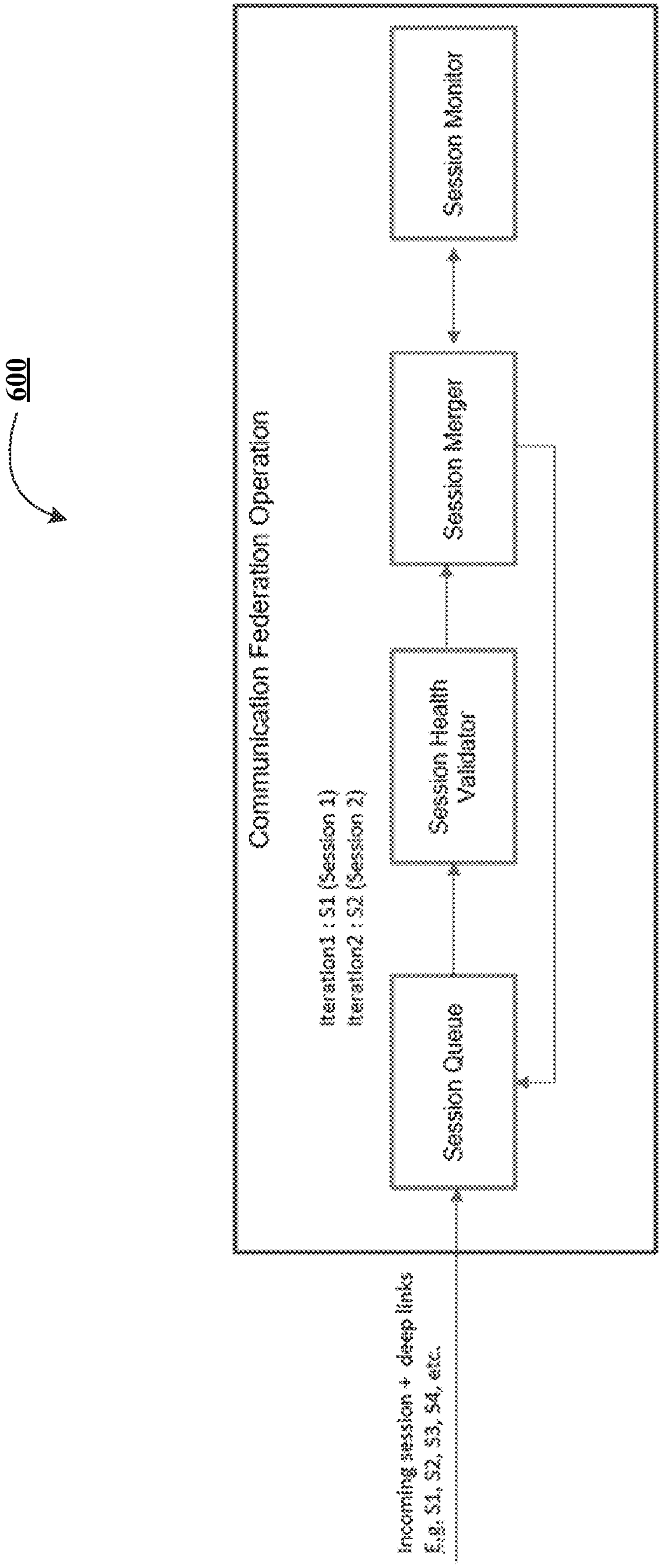
Figure 8:
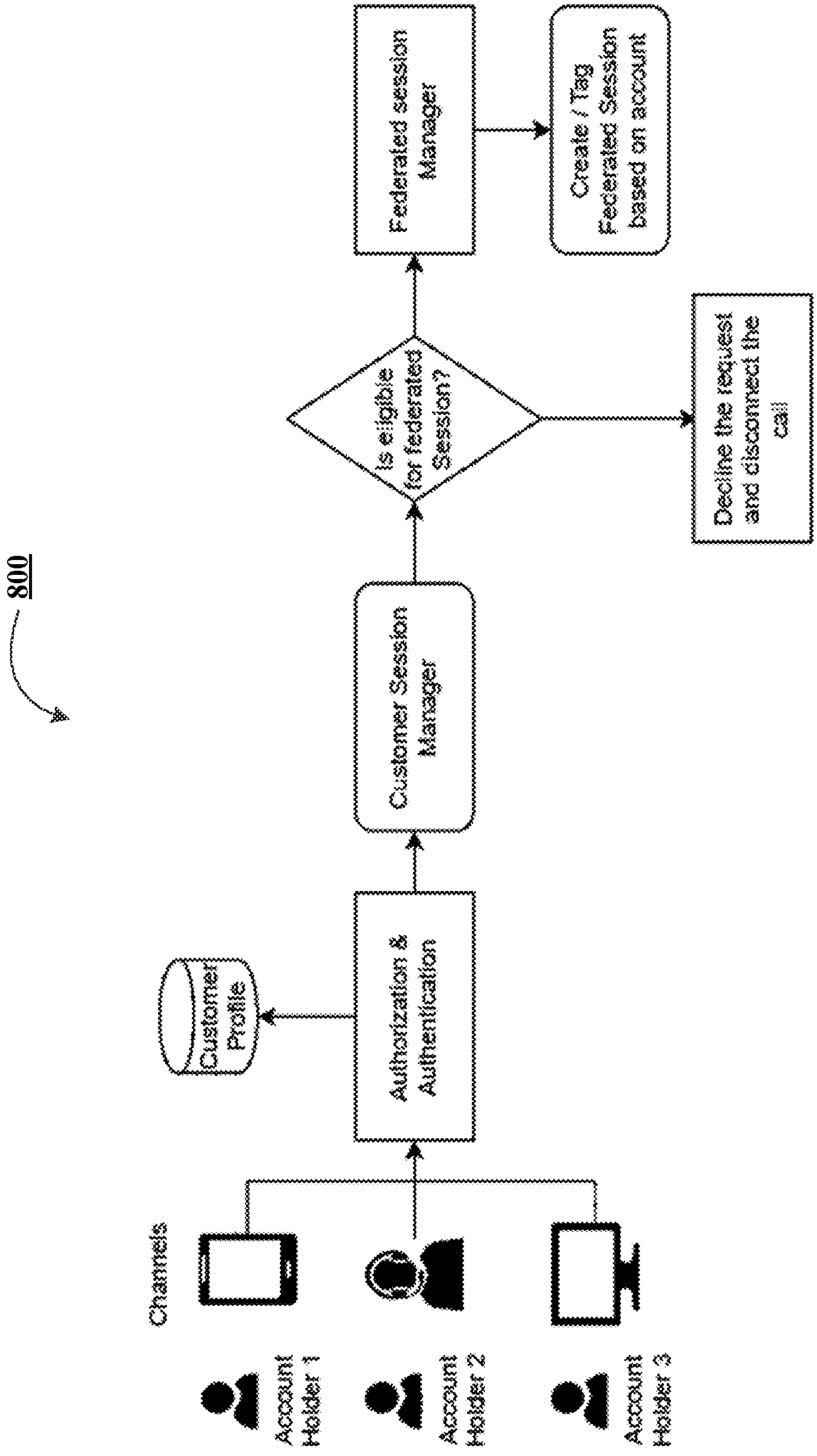
Figure 9:
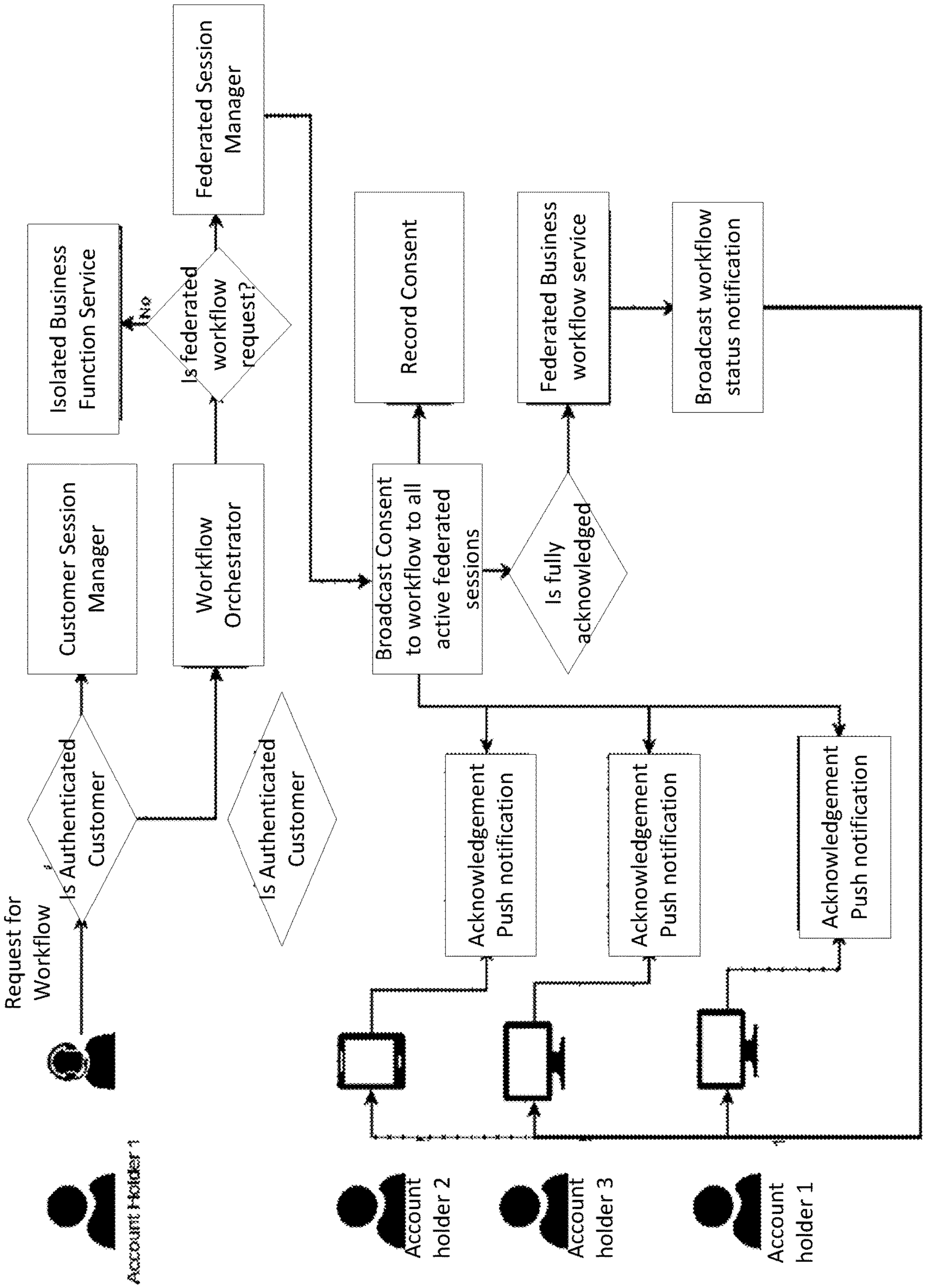

FIGS. 1A-1C illustrates technical components of an exemplary distributed computing environment for determining, managing, and securing data in federated data channels, in accordance with an embodiment of the disclosure;

FIG. 2 illustrates a process flow for determining, managing, and securing data in federated data channels, in accordance with an embodiment of the disclosure;

FIG. 3 illustrates a process flow for accessing and updating a virtual communication registry, in accordance with an embodiment of the disclosure;

FIG. 4 illustrates a process flow for applying the available agent communication channel to the first communication channel and the at least one third party communication channel based on the communication federation operation, in accordance with an embodiment of the disclosure;

FIG. 5 illustrates an exemplary flow diagram and exemplary databases for determining, managing, and securing data in federated data channels, in accordance with an embodiment of the disclosure;

FIG. 6 illustrates an exemplary flow diagram for a communication federation operation, in accordance with an embodiment of the disclosure;

FIG. 7 illustrates exemplary tables for Session ID creation, in accordance with an embodiment of the disclosure;

FIG. 8 illustrates an exemplary flow diagram for generating a communication session with federated data channels, in accordance with an embodiment of the disclosure; and FIG. 9 illustrates an exemplary flow diagram for a federated session event drive mechanism, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, “operatively coupled” may mean that components may be electronically connected and/or in fluid communication with one another.

As used herein, an “interaction” may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word “exemplary” is used herein to mean “serving as an example, instance, or illustration.” Any implementation described herein as “exemplary” is not necessarily to be construed as advantageous over other implementations.

As used herein, “determining” may encompass a variety of actions. For example, “determining” may include calculating, computing, processing, deriving, investigating, ascertaining, and/or the like. Furthermore, “determining” may also include receiving (e.g., receiving information), accessing (e.g., accessing data in a memory), and/or the like. Also, “determining” may include resolving, selecting, choosing, calculating, establishing, and/or the like. Determining may also include ascertaining that a parameter matches a predetermined criterion, including that a threshold has been met, passed, exceeded, and so on.

As used herein, a “resource” may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

Electronic communications, especially communications communication platforms such as interactive voice response (IVR) systems, cannot handle multi-party communications while also protecting privacy between each party’s communication data. For example, and where an account requires multiple parties to contribute over remote and electronic communications, a need exists for a system to protect user data over remote communications, while also promoting automatic and dynamic federated data channels to promote efficiency, data security, and automatic collection of communication data.

Accordingly, the present disclosure provides for the identification of a first communication channel and associated first communication data; a determination, based on the first communication data, of at least one third party communication requirement (e.g., based on multi-party account identification); an initiation, based on the at least one third party communication requirement, of at least one third party communication channel; and an assembling of the first communication channel and the at least one third party communication channel by a communication federation operation, wherein the communication federation operation organizes the first communication channel and the first communication data with the at least one third party communication channel and at least one third party communication data based on a federation session orchestrator. Additionally, the present disclosure further provides for a collection of the first communication data and the at least one third party communication data based on the federation session orchestrator, wherein the federation session orchestrator controls a pattern for requesting and collecting the first communication data and the at least one third party communication data.

In other words, the present disclosure provides a system, computer-implemented method, and computer program product that are configured to receive data from a primary data channel (e.g., such as via a telephone call which may leverage an interactive voice response system), determine an intent from the primary data channel data (e.g., by collecting the call responses from a user of the primary data channel), and determine whether a multi-party engagement is necessary to carry out the intent of the call. For instance, and where a primary caller of the primary data channel is calling to open an account or apply for an account and other joint account holders need to sign off or fill in information for this intent to be completed, the system will determine a multi-party engagement is necessary before moving on. Additionally, the system may generate deep links to transmit to the secondary user(s) (e.g., the joint account holders), whereby such deep links may be transmitted through various channels which have been used often by each user (this could be determined based on historical data of each user). The invention further provides a communication federation operation (or system) which is configured to join the primary data channel with the secondary data channel(s) selected via the deep link by the secondary user(s), such that the channels are merged on the receiving entity’s side (e.g., the financial institution side), but where each user can only see and/or hear the data particular to them. In this manner, the data for each user may remain secure.

Additionally, and in an instance where a primary user is listed for an account with at least one other joint account holder, the system may organize each of these channels based on a hierarchy (e.g., the channel associated with the primary user will need to perform the steps of the workflow/task first before the joint account holder’s channel is communicated with). Lastly, the federation session orchestrator is configured to take the data from each channel, collate and federate the data into a memory database based on matching each of the channel session’s unique IDs (which may be similar to an account ID for the joint account), and determine whether each step in the workflow has been completed for the intended task to be complete. Additionally, and in parallel to the federation session orchestrator’s performance, a multi model recorder may be configured to record each of the data being received via each channel. In this manner, a complete record may be generated for each workflow and/or task request.

What is more, the present disclosure provides a technical solution to a technical problem. As described herein, the technical problems include the security of data within federated data channels, the need for multi-party electronic communications within IVR, and the session management of multi-party electronic communications. The technical solution presented herein allows for determining, managing, and securing data in federated data channels by assembling multiple communication channels using a communication federation operation and based on a federation session orchestrator. In particular, the disclosure provided herein is an improvement over existing solutions to the technical problems identified herein, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for determining, managing, and securing data in federated data channels 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for determining, managing, and securing data in federated data channels, in accordance with an embodiment of the disclosure. In some embodiments, a system (e.g., similar to one or more of the systems described herein with respect to FIGS. 1A-1C and 2) may perform one or more of the steps of process flow 200. For example, a system (e.g., the system 130 described herein with respect to FIG. 1A-1C) may perform the steps of process 200.

As shown in block 202, the process flow 200 may include the step of identifying a first communication channel and associated first communication data. As used herein, the communication channel refers to data channel for transmitting communication data between a user and another user (such as an agent associated with an entity), whereby the communication channel may comprise text data transmissions, voice data transmissions, and/or the like. In some embodiments, the communication channel may comprise voice data transmissions that originate at a user device, such as a mobile device, which may be contact with an interactive voice response (IVR) system. In other words, and in some embodiments, the first communication channel occurs within an interactive voice response (IVR) channel type. In some such embodiments, the IVR may be configured to generate questions for the user at the mobile device, receive responses from the user, parse the responses, and determine a workflow for the user based on what the user wants to do (e.g., based on the responses given by the user, such as the reason for the communication session). As used herein, a plurality of communication channels may be occurring in parallel, but a first communication channel may be the trigger that kickstarts the processes described herein, whereby once a first communication channel is identified and received, the processes described herein (including the initiation of later communication channels such as a third party communication channel(s)) may occur secondarily and in parallel with the first communication channel.

Additionally, and as used herein, the communication data refers to data collected from the communication channel during a communication session (e.g., a phone call, an email exchange session, a texting session, and/or the like). In some embodiments, the communication session may comprise each of the communications between a user and an agent (such as an agent within an entity, such as a financial institution, company, and/or the like) and/or the user as the user interacts with an IVR, over a period of time where the communications are continuous. For instance, communications may be considered continuous where each communication is responsive to a previous communication message between the user and the agent. In some embodiments, the communication session may be limited to a pre-defined limit, such as 24 hours (which may be measured from the first communication received during a session either from the first user and/or the agent).

In some embodiments, the first communication data comprises an identification of an account identifier for the first communication channel, and wherein the at least one third party communication requirement is based on the account identifier. For example, the system may collect the communication data from the first communication channel, parse the communication data, and determine whether the user of the first communication channel has transmitted an account identifier over the first communication channel. Such an account identifier may comprise authentication credentials, an account identifier number (such as a unique string of alphanumeric characters which uniquely identifies an account within an entity), and/or the like to uniquely identify an account that the user associated with the first communication channel is a part of. In some embodiments, such an account identified by the account identifier may comprise a plurality of associated users (such as joint account holders), whereby any authentication credentials received over a communication channel may uniquely identify each user associated with the account (such as a specific joint account holder).

As shown in block 204, the process flow 200 may include the step of determining—based on the first communication data—at least one third party communication requirement. For example, the system may determine—based on the communication data collected from the first communication channel—whether or not a third party communication is required to complete the workflow determined in block 202. For example, and based on the first communication channel data, the system may determine whether a plurality of users need to be contacted via a plurality of communication channels (such as by a first communication channel, a second/third party communication channel, a third/another third party communication channel, . . . an nth communication channel, and/or the like) until the workflow has been completed. By way of non-limiting example, a workflow determined by the system may determine that the first communication channel data indicated that the user of the first communication channel would like to open a resource credit account (such as a loan) which is tied to a joint account associated with a plurality of users, but where the user of the first communication channel is not a primary account holder. Thus, and based on this example, the system may determine that a third party communication requirement is present and that the primary account holder should be contacted via a third party communication channel before moving forward in the workflow. As understood by those of skill in the art, the above-example is intended to be non-limiting and is only set forth for exemplary purposes.

Thus, and in other words, the third party communication requirement may be determined based on the account identifier and whether or not the associated account is associated with multiple users (e.g., a joint account), and whether in order to move forward with the workflow, another user of the account should be communicated with. In some embodiments, the third party communication requirement may comprise a primary joint account user account, such that a primary user listed on the account needs to be contacted first and foremost. In some embodiments, the third party communication requirement may indicate that the plurality of users associated with the account identifier comprises only a primary account holder and a joint account holder, two primary account holders and a plurality of joint account holders, at least one [or a plurality] of authorized users, and/or any combination of account holders listed herein.

As shown in block 206, the process flow 200 may include the step of initiating—based on the at least one third party communication requirement—at least one third party communication channel. For example, the system may initiate—after determining that a third party communication requirement is present—the at least one third party communication channel for the other user(s) identified with the third party communication requirement and associated with the same account identifier as that identified in block 204.

In some such embodiments, the system may access a virtual communication registry to identify available communication channel(s) that may be used for the third party communication channel. Additionally, and in some embodiments, the third party communication channel selected from the available communication channel(s) may be based on user preferences for the user(s) required by the account identifier, such that the system attempts to contact the required user(s) with their preferred communication channel. Such embodiments are described in further detail below with respect to FIGS. 3 and 5.

In some embodiments, the first communication channel and the at least one third party communication comprise one communication channel type. For example, the system may contact the required user(s) using the same type of communication channel (e.g., phone call, text message, email, instant messaging over an application, and/or the like) as the communication channel type as the first communication channel. Such communication channel type may be determined for the required user(s) based on a user preference for each required user(s) and/or based on the available communication channel(s) currently available. In some embodiments, the first communication channel and the at least one third party communication channel comprise different communication channel types. In contrast, and in some embodiments, the third party communication channel may be of a different channel type than the first communication channel. In such embodiments, the third party communication channel(s) may be based on available communication channel(s) currently available and/or the user preference(s) for the required user(s).

In some embodiments, and in the instance where a third party communication requirement is not present, then the system and the processes described herein may continue without contacting the [secondary] user (or other users) via a third party communication channel(s) (whereby, the number of users required to complete the workflow will be used to determine the number of users contacted for the account identifier and the number of communication channels used). For example, such a process not requiring the third party communication may continue from blocks 202 and 204 directly to block 210 (without collecting third party communication data).

As shown in block 208, the process flow 200 may include the step of assembling the first communication channel and the at least one third party communication channel by a communication federation operation, wherein the communication federation operation organizes the first communication channel and the first communication data with the at least one third party communication channel and at least one third party communication data based on a federation session orchestrator. For example, the system may As used herein, the communication federation operation refers to a system and/or process for generating a distributed communication session between multiple communication channels (e.g., a first communication channel and any required third party communication channels), such that the multiple communication channels are queued correctly (e.g., based on the workflow and each user account identifier for the account identifier) and merged without revealing private data between the users within the distributed communication session. Similarly, and as shown below in FIG. 6, exemplary flow of a communication federation operation is shown and described in more detail below.

Additionally, and based on the federation session orchestrator, the system may organize and synchronize the communication channels based on at least the workflow (overall and current step within the workflow) and the user account identifiers for each communication channel. Additionally, the federation session orchestrator may organize the communication channels and maintain the communication channels (such as by analyzing the current session health of each communication channel both before and during the communication session). Additionally, and during the communication federation operation, the system may add in an agent communication channel which may be organized based on the federation session orchestrator to speak with both user communication channels, separately and based on the federation session orchestrator. Such an embodiment is described in further detail below with respect to FIG. 4.

In some embodiments, the communication federation operation may comprise a process for organizing the identified at least one third party communication channel and the first communication channel based on identifying a primary user account associated with the first communication data or the at least one third party communication data. For example, and based on the account identifier and the users associated with the account identifier, the system may determine a primary user is associated with the account identifier and that the primary user must be contacted first before continuing with the workflow. For example, and in an instance where the user of the first communication channel is only an authorized user, and where the system determines that a primary user must be contacted over a third party communication channel, the system may halt the workflow until the primary user is contacted and the third party communication channel is verified as healthy by the communication federation operation and/or the federation session orchestrator. Additionally, and while completing the workflow, the federation session orchestrator may synchronize the communication channels such that at each block of the workflow where the primary user must agree or disagree, the federation session orchestrator will organize the communication channels such that the primary user is contacted first for the associated block. In some embodiments, and as described in further detail below, such a federation session orchestrator may organize the communication channels and apply an agent communication channel such that the agent communication channel is in contact with both the user communication channels to carry out the workflow.

As shown in block 210, the process flow 200 may include the step of collecting the first communication data and the at least one third party communication data based on the federation session orchestrator, wherein the federation session orchestrator controls a pattern for requesting and collecting the first communication data and the at least one third party communication data. For instance, the system may collect the communication data (e.g., first communication data and the third party communication data) within the communication session based on the federation session orchestrator and the associated workflow. In this manner, the federation session orchestrator may be used to determine which communication data is important to complete the workflow, at what points to request the communication data for completing the workflow, and how to organize the collected data to complete the workflow (such as organizing the collected communication data from the primary user of the account identifier first before the secondary/authorized user(s) communication data).

Additionally, and in some embodiments, the federation session orchestrator may control the pattern for requesting and collecting the communication data (first communication data and the third party communication data). Such a pattern for requesting and collecting the communication data may be based on the workflow identified by the system, such that the pattern identifies which user should be sent requests for information (e.g., the primary user(s) will be requested first for information/inputs and the authorized users/non-primary users may be requested secondarily/later). In some embodiments, the pattern based on the workflow may request inputs/information from the primary user(s) and for authorized/non-primary user(s) first and second, respectively, for each block before moving onto the next block within the workflow. In some embodiments, the pattern based on the workflow may request inputs/information from the primary user(s) and for authorized/non-primary user(s) first until completion of the workflow and then second until completion of the workflow, respectively.

FIG. 3 illustrates a process flow 300 for accessing and updating a virtual communication registry, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process flow 300.

In some embodiments, and as shown in block 302, the process flow 300 may include the step of accessing a virtual communication registry based on the first communication data. For example, and in some embodiments, the system may access a registry or database of virtual communication channels, whereby some of the virtual communication channels may be shown as currently available (i.e., an available communication channel) or currently unavailable (i.e., an unavailable communication channel). In some embodiments, the virtual communication registry may comprise a plurality of registries, whereby each registry is associated with a particular communication channel type (such as a registry comprising available phone numbers to call the third party user from for the third party communication channel, and/or the like). In some embodiments, and where the virtual communication registry comprises a plurality of registries, the system may select which registry to analyze and select an available communication channel based on a user preference for each user associated with the workflow. Additionally, and as described in further detail below, a virtual communication registry and an exemplary virtual number registry is shown below with respect to FIG. 5.

In some embodiments, and as shown in block 304, the process flow 300 may include the step of identifying—within the virtual communication registry—at least one available communication channel. For instance, and in some embodiments, the system may identify—within the virtual communication registry—at least one available communication channel, whereby the available communication channel is based on its current availability and based on a user preference for each individual user (such as the user's preference for the third party communication). Additionally, and as shown in an example embodiment, FIG. 5 (which is shown and described in detail below) shows a plurality of available communication channels as available virtual numbers.

In some embodiments, and as shown in block 306, the process flow 300 may include the step of selecting the at least one available communication channel for the at least one third party communication channel. For example, and in some embodiments, the system may select—from the at least one available communication channel(s)—an available communication channel for each third party communication channel. Thus, and based on the number of third party communication channels needed to complete the workflow, the same number of available communication channels will be selected, such that each third party communication channel will have its own available communication channel. In some embodiments, and based on each user's preference, each available communication channel may be of a different communication channel type. In some embodiments, and based on whether there are any available communication channels available for a preferred communication channel for a user, the system may instead use a backup or secondary communication channel (e.g., where there are no available communication channels for the preferred communication channel of a user), and/or the like.

In some embodiments, the selected at least one available communication channel is based on a user account preferred communication channel type associated with the user identifier (e.g., the user identifier associated with each individual user account). Additionally, and as shown below with respect to FIG. 5, a plurality of primary communication channel preferences, a plurality of secondary communication channel preferences, a plurality of channel routers, and/or the like are shown in an exemplary embodiment. Additionally, and in some embodiments, the user account preferred communication channel type comprises a primary channel preference, a secondary channel preference, and a channel router preference. Thus, and in some embodiments, the selection of an available communication channel may be based on a channel router selected as a preference by a user, whereby the channel router may comprise a specific communication method within the communication channel. For instance, and where the primary channel preference (which may also be referred to as a preferred communication channel herein throughout) is an application, the channel router identified may comprise a particular messaging method within the application, a dashboard notification within the application, a deep link within the application, and/or the like.

In some embodiments, and as shown in block 308, the process flow 300 may include the step of updating—based on the selected at least one available communication channel—the virtual communication registry with an account identifier or a user identifier for the selected at least one available communication channel. For example, and in some embodiments, the system may update the virtual communication registry(ies) based on the selected available communication channel(s) for the third party communication channel(s). Such an update may comprise a dynamic and automatic recording indicating that the selected available communication channel(s) are no longer available, and instead are in current use for the account of the account identifier.

In some embodiments, such an updating to the virtual communication registry(ies) may be generated based on a feedback loop, such as a feedback loop from a user device associated with the system. For instance, and in some such embodiments, the feedback loop may collect data based on whether user associated with the third party communication channel does not answer the initial third party communication request (e.g., the first message transmitted over the third party communication channel), and/or whether the user requests (via the third party communication channel/selected available communication channel) to use a different communication channel type. Thus, and based on this feedback loop, the system may automatically and dynamically change the selected available communication channel for the third party communication channel. Such an automatic and dynamic change may be based on whether the user responds to the initial communication (whereby the system may then move onto the secondary channel preference for the user) and/or whether the user requests a different communication channel type (whereby the system may again look at the available communication channels and select the available communication channel that matches the requested communication channel type).

In some embodiments, the updating of the virtual communication registry(ies) may additionally comprise a recording of the account identifier associated with the first communication channel/data, and/or the user account identifier for the third party communication channel. As used herein, the user account identifier refers to a unique sequence of alphanumeric characters which uniquely identifies each user associated with each account identifier within the system and/or associated with the system (e.g., within an entity/client using the system).

FIG. 4 illustrates a process flow 400 for applying the available agent communication channel to the first communication channel and the at least one third party communication channel based on the communication federation operation, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process flow 400.

In some embodiments, and as shown in block 402, the process flow 400 may include the step of identifying an available agent communication channel. For example, and in some embodiments, the system may identify an available agent communication channel and the associated available agent to communicate with the user of the first communication channel and any user(s) of the third party communication channel(s). Such an available agent and their available agent communication channel may be indicated within the virtual communication registry (such as by listing an Agent ID) and/or within a user account preference database. In some embodiments, such a user account preference database may comprise preferred agents that the user(s) have previously dealt with and communicated with, which may indicate a pre-existing relationship with the agent. As used herein, an available agent and the available agent communication channel refer to an agent and a communication channel that are not currently occupied and/or busy, and are currently online.

In some embodiments and as shown in block 404, the process flow 400 may include the step of applying the available agent communication channel to the first communication channel and the at least one third party communication channel based on the communication federation operation. For example, the system may apply the available agent communication channel to the first communication channel and the third party communication channel(s) based on the communication federation operation (and based on the federation session orchestrator which determines the pattern of requests and responses for each of the communication channels within the communication session, including the available agent communication channel). Additionally, and in some embodiments, the system may apply the available agent communication channel within the communication session organized and managed by the communication federation operation by organizing the available agent communication channel such that the available agent communication channel can communicate with each user of the account identifier (e.g., the user of the first communication channel, the user(s) of the third party communication channel, and/or the like), but where the communications with the agent and the other users are not visible, audible, public, and/or the like to an instant user. In this manner, each communication between the user and the available agent will remain private and will not be published to any of the other users associated with the account identifier. Such an embodiment will protect data security between each of the users, while also promoting a seamless, dynamic, and automatic generation and use of a federated data channels. Thus, and in other words, in some embodiments, the first communication data is protected from the at least one third party communication channel, and the at least one third party communication data is protected from the first communication channel.

In some embodiments, the available agent communication channel communicates with the first communication channel and the at least one third party communication channel at a same time or near same time. Thus, and for example, the available agent communication channel may be configured to—by the system and by the communication federation operation based on the federation session orchestrator—communicate with the first communication channel and the third party communication channel at the same time (such as for giving instructions to each of the users of the communication channels, and/or the like) or in near real time/near same time (e.g., giving instructions to each of the users in quick succession, and/or corresponding with each of the users in quick succession).

FIG. 5 illustrates an exemplary flow diagram and exemplary databases 500 for determining, managing, and securing data in federated data channels, in accordance with an embodiment of the disclosure. In some embodiments, a system (e.g., similar to one or more of the systems described herein with respect to FIGS. 1A-1C) may perform one or more of the steps of flow diagram and generating/maintaining exemplary databases 500. For example, a system (e.g., the system 130 described herein with respect to FIG. 1A-1C) may perform the steps of flow diagram and generating/maintaining exemplary databases 500.

As shown in exemplary flow diagram and exemplary databases 500, a first communication channel from a user may occur from a user device C1, and such first communication data may be extracted and parsed within the IVR orchestrator in order to detect an intention, determine a workflow (e.g., the intent workflow), and determine whether a third party requirement exists (e.g., whether a multi-party is required). Based on the determination that a third party requirement exists, the exemplary flow may continue to the intelligent deep link generator, which may be configured to generate intelligent deep links for the communication channels herein identified. Such intelligent deep links and their generation are discussed in co-pending application titled, "Systems and Methods for Generating Dynamic Links In Federated Data Channels" which is herein incorporated by reference in its entirety. Such intelligent deep links may be generated based on the virtual communication registry(ies) (which may comprise one or more available communication channels for selection for the third party communication channel(s), such as those shown as virtual phone numbers 1800-555-4505 and 1800-555-4506), and may be transmitted over the selected available communication channel(s). Additionally, and based on the user preferences of each user of the third party communication channel(s), the virtual communication registry may be used to select the preferred available communication channel(s) for each user (such as the primary channel preference listed for each user, or as a backup, the secondary channel preference). Similarly, the intelligent deep links may additionally be sent over the available communication channel determined and selected based on the data found in the user account preference database.

Upon generating the intelligent deep link and/or upon selecting the available communication channel, the system and the flow diagram 500 may continue to the communication federation operation to organize and maintain the first communication channel (e.g., the communication channel associated with C1) and the third party communication channel(s) (e.g., C2, . . . and not shown CN) based on the pattern and organization of the federation session orchestrator which may control the requests and the responses, and their associated collection of data between each communication channel. Additionally, and as shown in flow diagram 500, an available agent communication channel (A1) may additionally be applied by the communication federation operation to the communication session with the first communication channel and the third party communication channel(s). Further, and in some embodiments, the data collected from this communication session of the federation session orchestrator may be recorded fully using a multi-communication recorder, which is designed and configured to track and organize each of the response data received from each communication channel (e.g., including the first communication channel, any third party communication channels, and the available agent communication channel).

FIG. 6 illustrates an exemplary flow diagram 600 for a communication federation operation, in accordance with an embodiment of the disclosure. In some embodiments, a system (e.g., similar to one or more of the systems described herein with respect to FIGS. 1A-1C) may perform one or more of the steps of flow diagram 600. For example, a system (e.g., the system 130 described herein with respect to FIG. 1A-1C) may perform the steps of flow diagram 600.

As shown in exemplary flow diagram 600, the communication federation operation may determine the incoming communication sessions (e.g., the first communication channel and its associated communication session; the third party communication channel(s) and its associated communication session(s)), and may queue the communication channels into the proper queue based on the workflow and whether any of the users are primary user accounts and/or non-primary user accounts for the associated account identifier. Additionally, both before and during the communication session(s), the communication federation operation will continually determine the current session health of each of the communication channels before and during the session merger of the communication channels. Lastly, and upon the session merger, the communication federation operation may additionally monitor the entirety of the communication session (e.g., the entire communication session with all the users and individually with each of the users and their communication channels)

FIG. 7 illustrates exemplary tables 400 for Session ID creation, in accordance with an embodiment of the disclosure. In some embodiments, a system (e.g., similar to one or more of the systems described herein with respect to FIGS. 1A-1C) may perform one or more of the steps of generating and maintaining tables 700. For example, a system (e.g., the system 130 described herein with respect to FIG. 1A-1C) may perform the steps of generating and maintaining tables 700.

As shown in exemplary tables 700, a session ID creation may be generated and/or maintained—by the system—by determining the type of user account for each of the user accounts associated with an account ID (e.g., for account ID ***4001) which may comprise a plurality of users (e.g., Joint Account Users, such as those associated with customer or user ID 1001, 1002, 1003, and/or the like). Based on these account types for the account identifier and for each user account identifier, the system may organize a sequence of the user identifiers for contacting within the communication session (e.g., customer name A associated 1001 may be contacted first by an available agent over the available agent communication channel, then customer B associated 1002, then customer C associated with 1003**, and/or the like).

FIG. 8 illustrates an exemplary flow diagram 800 for generating a communication session with federated data channels, in accordance with an embodiment of the disclosure. In some embodiments, a system (e.g., similar to one or more of the systems described herein with respect to FIGS. 1A-1C) may perform one or more of the steps of exemplary flow diagram 800. For example, a system (e.g., the system 130 described herein with respect to FIG. 1A-1C) may perform the steps of exemplary flow diagram 800.

As shown in exemplary flow diagram 800, the communication session for the plurality of communication channels (e.g., the first communication channel, the third party communication channel(s), the available agent communication channels, and/or the like) may be generated using different types of communication channel types (such as over a mobile device application, a phone call, and/or the like) and each of the communication data collected from each of the communication channels may be used to authorize and authenticate each of the user accounts. In some such embodiments, the authorization and authentication may be matched to data within a customer database.

Additionally, and upon authorizing and authenticating each user account, the system may apply the user account data, the communication data from each communication channel, the account identifier, and/or the like to a customer session manager (e.g., which may be likened to the communication federation operation) which may be tasked with at least determining whether all the correct user accounts are present in each of the communication channels. In the instance where all the correct user accounts (e.g., all the primary and non-primary user accounts for the account identifier are present in the communication channels), then the system may generate the federated session for the plurality of communication channels (including the available agent communication channel). In some instances and where not all the correct users are present in the communication channels (such as where a primary user of the account identifier is missing), then the system may automatically decline the request and disconnect all the communication channels.

FIG. 9 illustrates an exemplary flow diagram 900 for a federated session event drive mechanism, in accordance with an embodiment of the disclosure. In some embodiments, a system (e.g., similar to one or more of the systems described herein with respect to FIGS. 1A-1C) may perform one or more of the steps of exemplary flow diagram 900. For example, a system (e.g., the system 130 described herein with respect to FIG. 1A-1C) may perform the steps of exemplary flow diagram 900.

For example, and as shown in exemplary flow diagram 900, the system may receive a request from an initial user (e.g., Account Holder 1) over a first communication channel, and the system may collect communication data regarding the authentication credentials of the initial users to determine whether the initial user is an authenticated user/customer. In the instance where the initial user is authenticated, then the system may continue to determine the proper or correct workflow (such as by a workflow orchestrator) based on the first communication data from the initial user. In the instance where the workflow requires a federated session between multiple communication channels, then the system may continue to the federated session manager (e.g., the communication federation operation). In the instance where the workflow does not require a federated session between multiple communication channels, then the system may determine an isolated function service is needed only for the initial user (e.g., only the initial user will need to be communicated with to complete the workflow).

Additionally, and where a federated session between multiple communication channels is necessary, the system may contact (such as via push notification) each of the required users for the workflow and for the account identifier associated with account holder 1. In some embodiments, the push notification may comprise a consent that has been broadcasted to all the required users. Further, and in some embodiments, each of the account holders associated with the required users (e.g., Account Holder 2, 3, and 1) may access the processes described herein and communicate with the federated session via various user devices. Once the consent has been acknowledged and accepted by all the required users, the system may continue to the federated session to carry out and complete the workflow. Additionally, and in some embodiments, each of the consents accepted and acknowledged by the users may be recorded automatically and in real time or near real time.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| Docket Number | U.S. patent application No. | Title | Filed On |
|---|---|---|---|
| 15781US1.014033.4909 | 18/608,406 | SYSTEMS AND METHODS FOR GENERATING DYNAMIC LINKS IN | Mar. 18, 2024 |

-continued

| Docket Number | U.S. patent application No. | Title | Filed On |
|---|---|---|---|
| | | FEDERATED DATA CHANNELS | |

What is claimed is:

1. A system for determining, managing, and securing data in federated data channels, the system comprising:
   a memory device with computer-readable program code stored thereon;
   at least one processing device operatively coupled to the at least one memory device and the at least one communication device, wherein executing the computer-readable code is configured to cause the at least one processing device to:
   identify a first communication channel and associated first communication data, wherein the first communication channel comprises a first user communication of a first user of the first communication channel;
   determine, based on the first communication data, at least one third party communication requirement;
   initiate, based on the at least one third party communication requirement, at least one third party communication channel including second communication data, wherein the third party communication requirement comprises a requirement of a second user communication of a second user of the at least one third party communication channel;
   identify an agent communication channel based on the first communication data;
   assemble the first communication channel, the at least one third party communication channel, and the agent communication channel in a federated session by a communication federation operation, wherein the communication federation operation organizes the first communication channel to communicate with the agent communication channel separate from the at least one third party communication channel communicating with the agent communication channel, wherein the first communication data is protected from the at least one third party communication channel such that the first communication data is not visible or audible to the second user of the at least one third party communication channel, and wherein the second communication data is protected from the first communication channel such that the second communication data is not visible or audible to the first user of the first communication channel; and
   collect the first communication data and the at least one third party communication data based on a federation session orchestrator, wherein the federation session orchestrator controls a pattern for requesting and collecting the first communication data and the at least one third party communication data.

2. The system of claim 1, wherein the first communication data comprises an identification of an account identifier for the first communication channel, and wherein the at least one third party communication requirement is based on the account identifier.

3. The system of claim 1, wherein the first communication channel and the at least one third party communication channel comprise one communication channel type.

4. The system of claim 1, wherein the first communication channel and the at least one third party communication channel comprise different communication channel types.

5. The system of claim 1, wherein the first communication channel occurs within an interactive voice response (IVR) channel type.

6. The system of claim 1, wherein the communication federation operation comprises a process for organizing the identified at least one third party communication channel and the first communication channel based on identifying a primary user account associated with the first communication data or the at least one third party communication data.

7. The system of claim 1, wherein executing the computer-readable code is configured to cause the at least one processing device to:
   access a virtual communication registry based on the first communication data;
   identify, within the virtual communication registry, at least one available communication channel;
   select the at least one available communication channel for the at least one third party communication channel; and
   update, based on the selected at least one available communication channel, the virtual communication registry with an account identifier or a user identifier for the selected at least one available communication channel.

8. The system of claim 7, wherein the selected at least one available communication channel is based on a user account preferred communication channel type associated with the user identifier.

9. The system of claim 8, wherein the user account preferred communication channel type comprises a primary channel preference, a second channel preference, and a channel router preference.

10. The system of claim 1, wherein executing the computer-readable code is configured to cause the at least one processing device to:
    identify an available agent communication channel; and
    apply the available agent communication channel to the first communication channel and the at least one third party communication channel based on the communication federation operation.

11. The system of claim 10, wherein the available agent communication channel communicates with the first communication channel and the at least one third party communication channel.

12. The system of claim 11, wherein the available agent communication channel communicates with the first communication channel and the at least one third party communication channel at a same time or near same time.

13. A computer program product determining, managing, and securing data in federated data channels, wherein the computer program product comprises at least one non-transitory computer-readable medium having computer-readable program code portions embodied therein, the computer-readable program code portions which when executed by a processing device are configured to cause the processor to:
    identify a first communication channel and associated first communication data, wherein the first communication channel comprises a first user communication of a first user of the first communication channel;
    determine, based on the first communication data, at least one third party communication requirement;
    initiate, based on the at least one third party communication requirement, at least one third party communication channel including second communication data, wherein the third party communication requirement comprises a requirement of a second user communication of a second user of the at least one third party communication channel;

identify an agent communication channel based on the first communication data;

assemble the first communication channel, the at least one third party communication channel, and the agent communication channel in a federated session by a communication federation operation, wherein the communication federation operation organizes the first communication channel to communicate with the agent communication channel separate from the at least one third party communication channel communicating with the agent communication channel, wherein the first communication data is protected from the at least one third party communication channel such that the first communication data is not visible or audible to the second user of the at least one third party communication channel, and wherein the second communication data is protected from the first communication channel such that the second communication data is not visible or audible to the first user of the first communication channel; and collect the first communication data and the at least one third party communication data based on a federation session orchestrator, wherein the federation session orchestrator controls a pattern for requesting and collecting the first communication data and the at least one third party communication data.

14. The computer program product of claim 13, wherein the first communication data comprises an identification of an account identifier for the first communication channel, and wherein the at least one third party communication requirement is based on the account identifier.

15. The computer program product of claim 13, wherein the communication federation operation comprises a process for organizing the identified at least one third party communication channel and the first communication channel based on identifying a primary user account associated with the first communication data or the at least one third party communication data.

16. The computer program product of claim 13, wherein the computer-readable program code portions which when executed by a processing device are configured to cause the processor to:

access a virtual communication registry based on the first communication data;

identify, within the virtual communication registry, at least one available communication channel;

select the at least one available communication channel for the at least one third party communication channel; and update, based on the selected at least one available communication channel, the virtual communication registry with an account identifier or a user identifier for the selected at least one available communication channel.

17. A computer-implemented method for determining, managing, and securing data in federated data channels, the computer-implemented comprising:

identifying a first communication channel and associated first communication data, wherein the first communication channel comprises a first user communication of a first user of the first communication channel;

determining, based on the first communication data, at least one third party communication requirement;

initiating, based on the at least one third party communication requirement, at least one third party communication channel including second communication data, wherein the third party communication requirement comprises a requirement of a second user communication of a second user of the at least one third party communication channel;

identifying an agent communication channel based on the first communication data;

assembling the first communication channel, the at least one third party communication channel, and the agent communication channel in a federated session by a communication federation operation, wherein the communication federation operation organizes the first communication channel to communicate with the agent communication channel separate from the at least one third party communication channel communicating with the agent communication channel, wherein the first communication data is protected from the at least one third party communication channel such that the first communication data is not visible or audible to the second user of the at least one third party communication channel, and wherein the second communication data is protected from the first communication channel such that the second communication data is not visible or audible to the first user of the first communication channel; and collecting the first communication data and the at least one third party communication data based on a federation session orchestrator, wherein the federation session orchestrator controls a pattern for requesting and collecting the first communication data and the at least one third party communication data.

18. The computer-implemented method of claim 17, wherein the first communication data comprises an identification of an account identifier for the first communication channel, and wherein the at least one third party communication requirement is based on the account identifier.

19. The computer-implemented method of claim 17, wherein the communication federation operation comprises a process for organizing the identified at least one third party communication channel and the first communication channel based on identifying a primary user account associated with the first communication data or the at least one third party communication data.

* * * * *